June 1, 1954   R. C. GRIFFITH   2,679,865
MIXING FAUCET
Filed Aug. 15, 1949
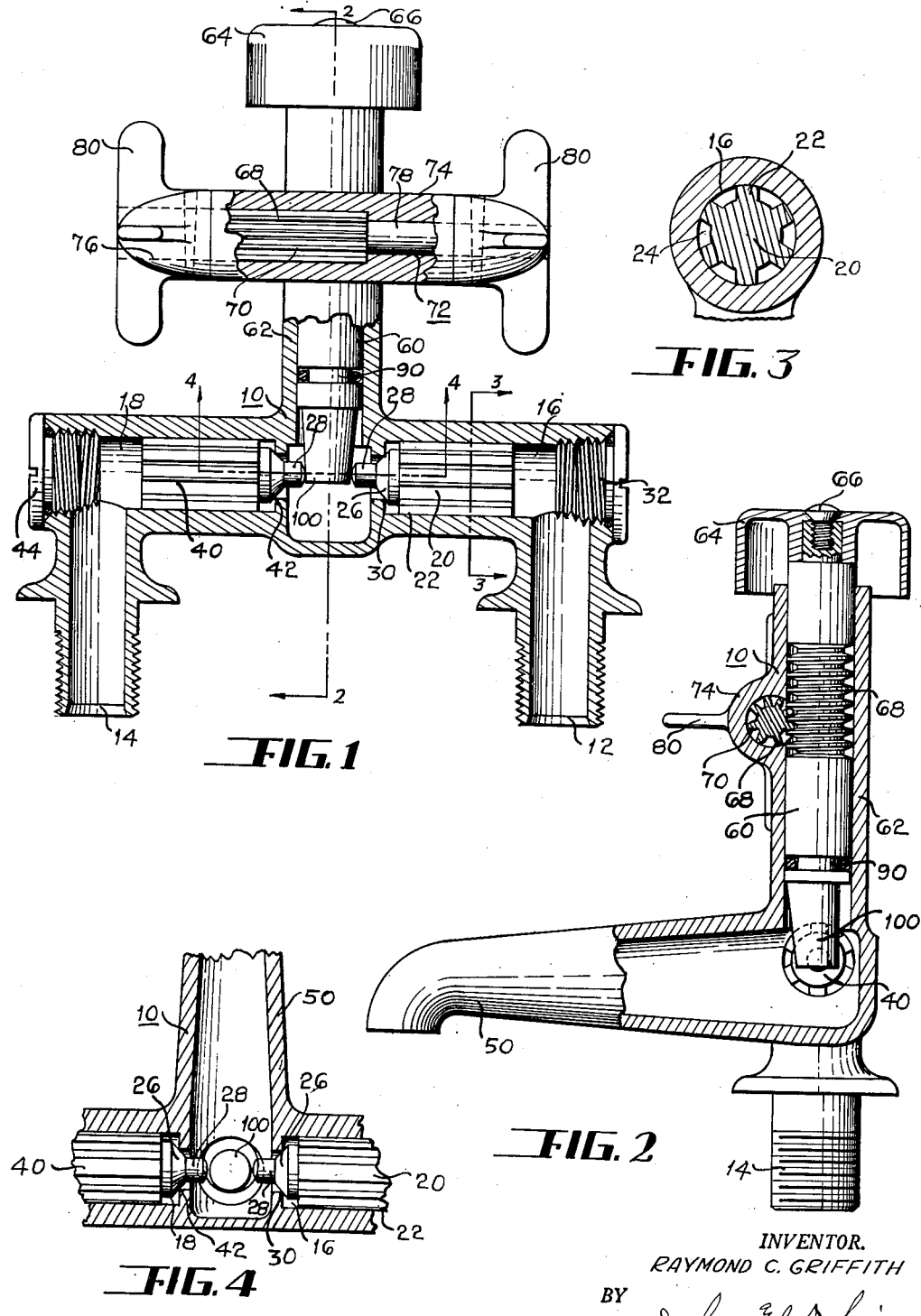
INVENTOR.
RAYMOND C. GRIFFITH
BY
Dybvig & Dybvig
HIS ATTORNEYS Patented June 1, 1954

2,679,865

UNITED STATES PATENT OFFICE 2,679,865

MIXING FAUCET

Raymond C. Griffith, Detroit, Mich.

Application August 15, 1949, Serial No. 110,280

6 Claims. (Cl. 137—636.1)

This invention relates to a faucet and more particularly to a mixing valve type of faucet, wherein the liquids from two sources may be intermixed as desired.

Numerous types of mixing valves have been produced wherein fluid from different sources, as for example, cold and hot water, may be mixed in any desired proportions, so as to obtain water at the outlet that is of the desired temperature. However, in these valves the rate of discharge of water cannot readily be changed without readjustment of the valve so as to obtain the desired temperature.

An object of this invention is to provide a mixing valve that permits adjustment of the valve so as to obtain the desired ratio and then permits adjustment of the rate of flow without changing the ratio or vice versa. This has been accomplished by the use of an offset tapered or conical member so arranged that the ratio of the flow from the two sources may be regulated so as to obtain the desired ratio and then the valve mechanism may be adjusted to open and close the valve mechanism so as to obtain the desired flow without in any manner altering the ratio of the liquids supplied by the two sources.

Another object of this invention is to provide a valve mechanism having two movements, one of the movements changing the ratio of liquids supplied from two sources and the other movement changing the amount of liquids flowing from each source without altering the ratio.

Other objects and advantages reside in the construction of parts, the combination thereof and the mode of operation, as will become more apparent from the following description.

In the drawings, Figure 1 is a fragmentary, cross sectional view taken substantially on the section line 1—1 of Figure 2.

Figure 2 is a cross sectional view taken substantially on the line 2—2 of Figure 1.

Figure 3 is a cross sectional view taken substantially on the line 3—3 of Figure 1.

Figure 4 is a fragmentary end view of the valve actuating member, looking substantially in the direction of the arrow 4—4 in Figure 2.

Referring to the drawings, the reference character 10 indicates the main body of a faucet or mixing valve. Member 10 is provided with a pair of intake passages 12 and 14, one of which may be connected to a cold water main and the other to a hot water main, although not necessarily so limited. These intake passages extend upwardly, as viewed in Figure 1, and terminate in a pair of horizontal passages 16 and 18, cylindrical in cross sectional area. The cylindrical passage 16 has mounted therein a piston or valve member 20, provided with a plurality of radially disposed ribs 22 cooperating to form a plurality of passages 24, so that the side of the piston does not seal the cylindrical passage or cavity 16. Member 20 is provided with a bevelled or a frustum-conical portion 26 merging into a cylindrical projection 28. The conical portion 26 is adapted to engage a valve seat portion 30 formed in the main body 10. Valve member 20 may be inserted through the end of the cylindrical cavity 16, which end is normally closed by a screw threaded plug 32. The cylindrical passage or cavity 18 is provided with a piston-like valve member 40, identical to valve member 20, and normally seated against the valve seat 42. The piston-like valve member 40 may be removed and reinserted by removing the cap 44. The two valve members 20 and 40 are normally seated and held against their valve seats by the water pressure in the two sources of supply. In the event the water pressure is very low, light weight coil springs, not shown, are mounted in compression between the cap members 32 and 44, and the respective piston-like valve members 20 and 40. These valve springs are not absolutely necessary. Normally, the piston-like valve members are mounted so as to be held in closed position by the water pressure.

By actuating the piston-like valve member 20 to the right, as viewed in Figure 1, and by actuating the piston-like valve member 40 to the left, as viewed in Figure 1, it can readily be seen that the valves are opened, so as to permit water, or whatever the fluid may be, to flow through the valve and be discharged through the outlet spigot 50. A suitable mechanism for actuating the piston-like valve members, so as to open the valve to any desired degree in order to obtain the proper mixture, will now be described.

A valve stem 60 is mounted in the upwardly directed tubular portion 62 of the main body 10. This valve stem 60 has fixedly attached thereto a hand wheel 64 held in position by a suitable screw 66, so that upon the hand wheel 64 being rotated, the valve stem 60 is rotated. The valve stem 60 is also provided with a plurality of annular gear-like teeth 68, meshing with a gear 70 integral with or fixedly attached to a shaft 72 inserted in a suitable aperture in the transverse portion 74 integral with the main body 10. The shaft 72 has one end 76 provided with a diameter equal to the maximum diameter of the gear 70. The other end 78 of the shaft 72 is reduced so that the shaft 72 and the gear 70 may be inserted from the right, as viewed in Figures 1 and 5, the reduced end 78 clearing the gear teeth 68 of the valve stem 60. A pair of winged members 80 are fixedly attached to the ends of the shaft 72. It can readily be seen that as the shaft 72 is rotated by means of one of the winged members 80, the valve stem 60 may be raised or lowered.

The valve stem 60 is provided with an annular groove 90 in which is mounted a suitable packing gasket. The lower end of the stem 60 is provided with a tapered frustum-conical portion 100 that is tilted or offset with respect to the longitudinal axis of rotation of the valve stem 60. This frustum-conical tilted offset portion 100 is positioned between the projection 28 of the piston-like valve members 20 and 40.

From this it can readily be seen that by rotating the valve stem 60, the relative position of the tilted offset frustum-conical portion 100 with respect to the center line of the valve stem 60 is angularly adjustable. This results in one of the piston-like valve members being removed from its valve seat a greater or lesser distance than the other piston-like valve member is removed from its valve seat. By this arrangement, it can readily be seen that the ratio of hot water to cold water is altered by rotating the valve stem 60.

When the water discharged from the mixing valve has the desired temperature, it is possible to regulate the rate of flow of water at this temperature by rotating one of the members 80 so as to raise or lower the valve stem 60, as viewed in Figures 1 and 2 to increase or decrease the rate of flow. If, for example, it is found desirable to increase the rate of flow, the valve stem 60 is actuated downwardly so as to cause the larger diameter of the frustum conical portion to engage the projections 28, thereby opening both of the valves. If it is found desirable to reduce the rate of flow, it is merely necessary to actuate one of members 80 to raise the valve stem 60, thereby causing the projections 28 to partially close, or completely close the water passages.

The bevelled or frustum conical portion 26, forming a part of member 20, has merely been shown for the purpose of illustration. In actual practice a rubber sealing member of any suitable contour may be used. For example, a hollow, tubular-like, rubber gasket may be attached to the end of member 20, so as to seal the valve by contacting the margins of the aperture in the end of the cylindrical cavity.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A mixing valve adapted to be connected to two sources of fluid supply, said valve including a main body portion provided with a pair of cylindrical cavities, one of the cylindrical cavities being connected to one source of fluid supply, the other cylindrical cavity being connected to the other source of fluid supply, and a tubular portion extending at right angles to the longitudinal axis of the cylindrical cavities, each of the cylindrical cavities being provided with an opening extending into the tubular portion, a pair of valve members one for each of the cylindrical cavities, each of said valve members being provided with a bevelled portion adapted to engage the margin of the opening connecting the cylindrical cavity to the tubular portions, the outer margin of the bevelled portion terminating in a cylindrical portion having a diameter considerably less than the diameter of the cylindrical cavity, the valve member being provided with projections having a diameter less than the diameter of the openings connecting the cylindrical cavities to the tubular portion, the main body of each of the valve members having peripherally disposed longitudinally extending ribs subtended by passages, the outer periphery of the ribs having a diameter slightly less than the diameter of the cylindrical cavity so that fluid passes through the passages when the valve members are open, and means including a valve stem mounted for reciprocatory and rotary movement in the tubular portion, said valve stem terminating in a frustum-conical portion offset and tilted with respect to the longitudinal axis of the valve stem, the projections on the ends of the valve members contacting the sides of the frustum-conical portion, the valve stem being provided with annular gear-like teeth, means for causing longitudinal movement of the valve stem to actuate the valve members to open and close proportionately, the rotary movement of the valve stem causing the valve members to open or close through varying degrees to thereby change the ratio of fluid flowing from each of the sources of supply through the valve, said last mentioned means including a pinion journalled in the main body portion, said pinion having teeth meshing with the annular teeth on the valve stem so that rotation of the pinion adjusts the opening of the valve members.

2. A mixing valve according to claim 1, wherein the pinion extends at right angles to the direction of the valve stem and is attached to a pair of handles for rotating the pinion.

3. A mixing valve according to claim 1, wherein the valve stem is provided with a handle for rotating the same to adjust the ratio of the fluid supplied from the two sources, and the pinion being connected to handle means, the rotation of which changes the rate of flow of fluid without changing the ratio.

4. In a faucet comprising a main body having a mixture chamber from which extends a plurality of tubular portions, two of said tubular portions each being connected to a separate source of fluid supply and having beveled margins in the opening adjacent said mixing chamber, fluted valve members slidably engaging the inner diameter of each of the two tubular portions, each of said valve members having a reduced diameter extending into a beveled portion adapted to engage the beveled margin, said beveled portion terminating into a cylindrical projection extending into the mixing chamber, one of said tubular portions forming a nozzle for the flow of fluid from said mixing chamber, another of said tubular portions forming a bearing, the major portion of a valve stem being rotatably supported by said bearing, said valve stem terminating into a tapered frustum-conical portion which is offset with respect to the axis of the stem, said frustum-conical portion extending into the mixing chamber and contacting the cylindrical projections, means for moving said stem inwardly to open the valve members and outwardly for closing the valve members, rotatable movement of the stem being adapted to vary the ratio of fluid flowing through each valve from its source of supply, the improvement being said valve stem having annular threads at its intermediate portion, a pinion rotatably mounted in said bearing, teeth in said pinion in meshed engagement with said annular threads on the valve stem to permit longitudinal movement inwardly to engage said cylindrical projections and thereby opening said valve members.

5. In a faucet comprising a main body having a mixing chamber from which extends a plurality of tubular portions, two of said tubular portions each being connected to a separate source of fluid supply and having beveled margins in the opening adjacent said mixing chamber, fluted valve members slidably engaging the inner diameter of each of the two tubular portions, each of said valve members having a reduced diameter extending into a beveled portion adapted to engage the beveled margin, said beveled portion terminating into a cylindrical projection extending into the mixing chamber, one of said tubular portions forming a nozzle for the flow of fluid from said mixing chamber, another of said tubular portions forming a bearing, the major portion of a valve stem being rotatably supported by said bearing, said valve stem terminating into a tapered frustum-conical portion which is offset with respect to the axis of the stem, said frustum-conical portion extending into the mixing chamber and contacting the cylindrical projections, the improvement being said valve stem being rotatably and slidably mounted in said bearing, means for moving said valve stem inwardly to open said valve members, said means comprising a handle for rotating the valve stem, and a pinion gear mounted in the bearing in meshed engagement with the annular threads on the stem, handles on the end of the pinion so that rotation of the pinion handles transmits longitudinal movement to the valve stem.

6. In a faucet comprising a main body having a mixing chamber from which extends a plurality of tubular portions, two of said tubular portions each being connected to a separate source of fluid supply and having beveled margins in the opening adjacent said mixing chamber, fluted valve members slidably engaging the inner diameter of each of the two tubular portions, each of said valve members having a reduced diameter extending into a beveled portion adapted to engage the beveled margin, said beveled portion terminating into a cylindrical projection extending into the mixing chamber, one of said tubular portions forming a nozzle for the flow of fluid from said mixing chamber, another of said tubular portions forming a bearing, the major portion of a valve stem being rotatably supported by said bearing, said valve stem terminating into a tapered frustum-conical portion which is offset with respect to the axis of the stem, said frustum-conical portion extending into the mixing chamber and contacting the cylindrical projections, the improvement being the valve members being floatably mounted in the tubular portions and the valve stem being provided with a handle for rotating the valve stem in the bearing, and the valve stem having annular threads at its intermediate portion, a pinion rotatably mounted in said bearing on an axis perpendicular to said valve stem, the teeth of said pinion in meshed engagement with said annular threads, handles on the ends of the pinion so that rotation of the pinion handles transmits longitudinal movement to the valve stem.

References Cited in the file of this patent

UNITED STATES PATENTS

| Number | Name | Date |
|---|---|---|
| 748,115 | Soderlund | Dec. 29, 1903 |
| 1,326,247 | Zengel | Dec. 30, 1919 |
| 1,573,210 | Whidden | Feb. 16, 1926 |
| 1,577,355 | Polfy | Mar. 16, 1926 |
| 2,038,943 | La Fountain | Apr. 28, 1936 |
| 2,225,759 | Strout | Dec. 24, 1940 |